Patented Dec. 8, 1953

2,662,074

UNITED STATES PATENT OFFICE 2,662,074

COPPER COMPLEXES OF MONOSULFONAMIDO FORMAZYL DYES

Robert A. Brooks, Salem, N. J., assignor to E. I. du Pont de Nemours and Company, Wilmington, Del., a corporation of Delaware No Drawing. Application June 5, 1952,
Serial No. 291,969

1 Claim. (Cl. 260—149)

This invention relates to novel organic compounds useful as dyestuffs for certain textile fibers, especially nylon and wool.

My invention is based on the discovery that the copper complexes of certain novel, formazyl dyes as more fully defined below possess the rare property of dyeing nylon and other hydrophobic fibers in bright, deep blue shades from a neutral bath, provided they contain in the molecule one, but not more than one sulfonamido group in meta position to a metallizable nitrogen atom. From the practical viewpoint, this is an important discovery, because dyes capable of dyeing nylon from a neutral bath have been lacking in the blue region of the spectrum.

The novel formazyl dyes referred to above may be represented by the general formula—

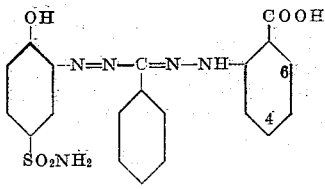

wherein the benzoic acid ring may have a chlorine atom in one of the positions 4, 6, but wherein the dye molecule is otherwise unsubstituted. It will be noted that the dye molecule is particularly characterized by having an OH, COOH pair in opposite rings but each situated ortho to an N-atom, and that the phenol ring bears a sulfonamido radical in position meta of an N-atom. It will be noted further that tautomeric rearrangement may interchange the positions of the azo and hydrazo linkages.

These novel formazyl dyes may be synthesized by diazotizing 2-aminophenol-4-sulfonamide and coupling the diazo compound, under alkaline conditions, to an aryl-hydrazone compound obtained by condensing the hydrazine of anthranilic acid or the corresponding monochloro derivative thereof with benzaldehyde. The azo-hydrazone compound thus obtained is then copperized in known manner, for instance by reacting the same in an ammoniacal aqueous solution with a copper salt. Recovery of the copperized dye may then be effected simply by filtration and washing.

An alternative method available is to diazotize anthranilic acid or its 4- or 6-chloro derivative and couple the diazo compound to the aryl hydrazone obtained by condensing 2-hydroxy-5-sulfonamido-1-phenylhydrazine with benzaldehyde. Copperization may then be effected in the manner indicated above.

Without limiting my invention, the following examples are given to illustrate my preferred mode of operation. Parts mentioned are by weight.

EXAMPLE 1

(a) *Preparation of azo-hydrazone compound*

A slurry of 56.5 parts of 2-aminophenol-4-sulfonamide in 450 parts of water containing 21.9 parts of hydrochloric acid was heated to 60° C. and filtered. The filtrate was cooled to room temperature and iced to 0° C. A solution of 20.7 parts of sodium nitrite in 50 parts of water was added slowly with agitation while maintaining the temperature at 0° to 5° C.

In a separate vessel, 77 parts of benzaldehyde o-carboxyphenyl hydrazone were added to a solution of 40 parts of sodium hydroxide in 500 parts of water. The clear solution thus obtained was iced to 0° C.

The diazo slurry was added quickly to the hydrazone solution with rapid agitation. Coupling began at once but 2 hours of agitation at 5°–10° C. were required before a negative test for diazo was obtained with resorcinol. Glacial acetic acid was then added dropwise until a pH of approximately 8 was obtained. The mixture was warmed to room temperature and filtered. After drying at 75° C., the azo-hydrazone compound was obtained in a state of high purity.

(b) *Preparation of the copper complex*

A clear, dark solution was produced by dissolving 13.2 parts of the crude color base, above, in 45 parts of 28% ammonia. Similarly, 6 parts of copper acetate were dissolved in 50 parts of water and 45 parts of 28% ammonia. With rapid agitation, these solutions were mixed and gently warmed. The copper complex was precipitated, isolated by filtration and washed with water. After drying at 75° C., the essentially pure metallized product was obtained. It was a bright-blue powder, insoluble in water but readily soluble in dimethylformamide. It dyed nylon from a neutral bath in attractive blue shades with good light fastness but only moderate wash fastness.

In a manner similar to the above example, the copper complexes of the following formazyl dye bases were prepared:

| Example | Diazo component from— | Hydrazone prepared from— |
|---|---|---|
| 2 | 2-aminophenol-4-sulfonamide | 4-chloro-2-amino-benzoic acid. |
| 3 | do | 6-chloro-2-amino-benzoic acid. |

In all the cases above, the color obtained after copperization dyed nylon from a neutral bath in attractive bright, blue shades of good fastness to light.

EXAMPLE 4

A slurry of 5.15 parts of 2-amino-4-chlorobenzoic acid in 100 parts of water containing 2.20 parts of hydrochloric acid was heated to 60° C. and filtered. The filtrate was iced to 2° C. and 2.07 parts of sodium nitrite in the form of an aqueous solution were added slowly, as taken up. In a separate vessel, 8.75 parts of benzaldehyde-(2 - hydroxy - 5 - sulfonamido) - phenyl - hydrazone were dissolved in 150 parts of water containing 4 parts of sodium hydroxide. The solution was iced to —2° C. and the diazo solution was added to it while maintaining good agitation. After further stirring for one hour, the reaction mass was acidified with acetic acid, and the precipitated azo-hydrazone dye base was filtered off and washed.

The copper complex was then prepared as described in Example 1. It was found to produce blue dyeings, of good fastness to light and fair to good fastness to washing, when applied to nylon or wool from a neutral dye bath.

It will be understood that the details of the above examples may be varied widely without departing from the spirit of the invention. Thus, the operations of diazotizing, coupling, preparing the hydrazines and condensing the latter with benzaldehyde, are per se well known, and may be varied within the skill of those engaged in this art. The only precaution to be observed is to avoid subjecting the color bases (that is, prior to copperization) to prolonged contact with strong alkali except at temperatures near or below 0° C.

For copperization, any water-soluble salt of copper may be used, for instance the acetate, sulfate, chloride or nitrate. The use of ammonia enables metallization to be achieved at room temperature, but is otherwise not essential.

The practical advantages of my invention will now be readily apparent. The copper complexes of this application are capable of producing bright, blue shades, of good fastness to light and moderate to good fastness to washing, on nylon and wool. Analogous compounds which contain free sulfonic acid groups instead of sulfonamide groups dye these fibers from an acid bath only. The compounds of this invention have the advantage of dyeing from a neutral bath, and may be used in combination with other neutral dyeing colors, designed for use on nylon fiber. Such neutral dyeing colors have the advantages over the acid colors of producing levelness in dyeing (particularly on nylon), of producing heavy shades on nylon and of not having a tendering effect on wool. Prior to my discovery of the dyestuffs of this application, a bright blue for the said neutral-dyeing line was entirely lacking.

My novel compounds may also be used for dyeing other hydrophobic fiber, for instance polyacrylonitrile.

The dyestuffs of this invention may be prepared for dyeing in the same manner as the other neutral-dyeing dyes above mentioned, that is by an aqueous milling treatment preferably in the presence of a dispersing agent such as a lignin sodium sulfonate. The dyes so milled are applied to the nylon or wool fibers from a neutral aqueous bath at about 80–100° C.

I claim as my invention:

The copper derivatives of formazyl dyes having the general formula

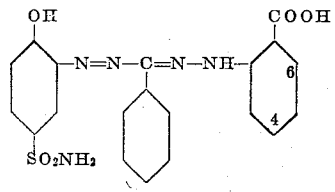

wherein the benzoic acid radical is satisfied in positions 4 and 6 by members of the group consisting of hydrogen and chlorine but contains not more than 1 Cl-atom, said copper derivatives being characterized by dyeing nylon from a neutral, aqueous bath in blue shades.

ROBERT A. BROOKS.

References Cited in the file of this patent

Saunders: "Aromatic Diazo Compounds," 1949, pages 214–5.